(12) United States Patent
Mizusaki et al.

(10) Patent No.: US 7,985,486 B2
(45) Date of Patent: Jul. 26, 2011

(54) COATING COMPOSITION FOR A METAL, AND METAL MATERIAL HAVING A COATING OF SUCH COATING COMPOSITION

(75) Inventors: Toru Mizusaki, Echizen (JP); Norio Nakamura, Echizen (JP); Shuichiro Shinohara, Echizen (JP)

(73) Assignee: Nissin Chemical Industry Co., Ltd., Echizen-Shi (JP)

( * ) Notice: Subject to any disclaimer, the term of this patent is extended or adjusted under 35 U.S.C. 154(b) by 288 days.

(21) Appl. No.: 11/898,073

(22) Filed: Sep. 7, 2007

(65) Prior Publication Data

US 2008/0063892 A1    Mar. 13, 2008

(30) Foreign Application Priority Data

Sep. 8, 2006 (JP) ................. 2006-243762

(51) Int. Cl.
*B32B 15/08* (2006.01)
*B32B 15/082* (2006.01)
*B32B 15/09* (2006.01)
*B32B 15/092* (2006.01)
*B32B 15/095* (2006.01)

(52) U.S. Cl. ..... 428/626; 428/334; 428/418; 428/425.8; 428/457; 428/458; 428/461

(58) Field of Classification Search .......... None
See application file for complete search history.

(56) References Cited

U.S. PATENT DOCUMENTS

| | | | | |
|---|---|---|---|---|
| 4,172,064 A | * | 10/1979 | Keeler | 524/762 |
| 4,385,138 A | * | 5/1983 | Sagane et al. | 523/402 |
| 5,308,389 A | * | 5/1994 | Russo et al. | 427/385.5 |
| 5,650,543 A | * | 7/1997 | Medina | 568/616 |
| 2003/0078307 A1 | * | 4/2003 | Shinohara et al. | 516/113 |
| 2005/0227900 A1 | | 10/2005 | Veltman | |
| 2006/0128831 A1 | * | 6/2006 | Cook et al. | 523/160 |

FOREIGN PATENT DOCUMENTS

| | | | |
|---|---|---|---|
| JP | 63-84671 A | | 4/1988 |
| JP | 5-140491 A | | 6/1993 |
| JP | 9-48943 A | | 2/1997 |
| JP | 10-330683 A | | 12/1998 |
| JP | 2000-104015 A | | 4/2000 |
| JP | 2002-129356 A | | 5/2002 |
| JP | 2002-348797 A | | 12/2002 |
| JP | 2003-049394 A | | 2/2003 |
| JP | 2004-261679 A | | 9/2004 |
| JP | 2005-146159 A | | 6/2005 |
| JP | 2005154912 A | * | 6/2005 |
| JP | 2005-272619 A | | 10/2005 |

\* cited by examiner

*Primary Examiner* — Monique R Jackson
(74) *Attorney, Agent, or Firm* — Birch, Stewart, Kolasch & Birch, LLP

(57) ABSTRACT

A coating composition for a metal is provided. The coating composition comprises a coating composition for a metal comprising a synthetic resin solid content (A); a filler (B); and a mixture of (C-1) acetylene glycol represented by the following general formula (1):

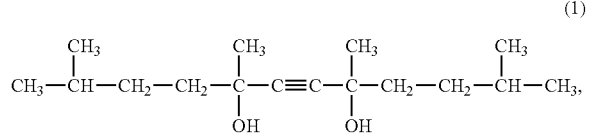

(1)

and/or an ethoxylated derivative of the acetylene glycol represented by the following general formula (2):

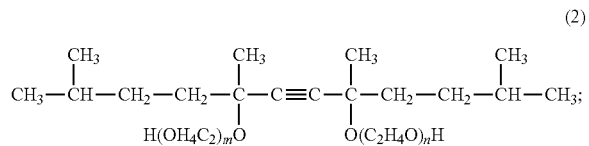

(2)

and (C-2) at least one member selected from polyoxy(ethylene-propylene) block polymer represented by the following formula (3):

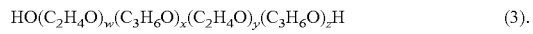

(3)

12 Claims, No Drawings

COATING COMPOSITION FOR A METAL, AND METAL MATERIAL HAVING A COATING OF SUCH COATING COMPOSITION

CROSS-REFERENCE TO RELATED APPLICATION

This non-provisional application claims priority under 35 U.S.C. §119(a) on Patent Application No. 2006-243762 filed in Japan on Sep. 8, 2006, the entire contents of which are hereby incorporated by reference.

TECHNICAL FIELD

This invention relates to a coating composition for a metal which exhibits excellent rust preventive properties simultaneously with improved water resistance and good adhesion to the metal. This invention also relates to a metal material having a coating formed by such coating composition.

BACKGROUND ART

Lead salt rust preventive pigments such as minium, lead cyanamide, and calcium metaplumbate, and metal chromate rust preventive pigments such as basic zinc chromate and strontium chromate had once been the main reagent used for preventing the rust. Use of such reagent, however, was gradually restricted in consideration of the health hazard and environmental conservation. Since then, non-polluting, non-toxic rust preventive pigments have been developed. Exemplary such rust preventive pigments include metal phosphates such as zinc phosphate, calcium magnesium phosphate, titanium phosphate, and silica phosphate; condensed metal phosphates such as aluminum tripolyphosphate; metal phosphorite such as zinc phosphorite, calcium phosphorite, strontium phosphorite, and aluminum phosphorite; zinc molybdate, calcium molybdate, barium borate, and zinc borate. Use of these non-polluting, non-toxic rust preventive pigments did not bring a major change since rust preventive pigments were still used.

JP-A 5-140491 (Patent Document 1) discloses a waterborne etch-resistant coating composition for a metal plate produced by adding a surfactant and an acetylene alcohol compound and/or an acetylene glycol compound. In this coating composition, the resin component is uniformly distributed on the metal surface by the use of a surfactant and the use of the acetylene alcohol compound combined with an acetylene glycol compound, and the etch-resistance is realized by the resin.

JP-A 2000-104015 (Patent Document 2) discloses a thermosetting rust preventive coating composition comprising a water-borne polyurethane resin having the thermosetting property. Use of the urethane resin, however, is associated with the drawback of high cost.

DISCLOSURE OF THE INVENTION

The present invention has been completed in view of the situation as described above, and an object of the present invention is to provide a coating composition for a metal which does not contain the rust preventive pigment including the toxic lead salt and chromium salt rust preventive pigments, and which exhibit excellent water resistance and adhesion to the metal. Another object of the present invention is to provide a metal material having a coating formed from such coating composition for the metal.

The inventors of the present invention made an intensive study to realize the objects as described above, and found that coating composition for a metal prepared by blending the synthetic resin and the filler which constitute the base of the coating composition with a mixture of an acetylene glycol surfactant and a polyoxy(ethylene-propylene) block polymer having a weight average molecular weight of a particular range exhibits an excellent rust preventive properties simultaneously with improved water resistance and high adhesion to the metal. The present invention has been completed on the basis of such finding.

Accordingly, this invention provides a coating composition for a metal comprising a coating composition for a metal comprising 100 parts by weight of a synthetic resin solid content (A);
1 to 200 parts by weight of a filler (B); and
0.01 to 10 parts by weight of a mixture of
(C-1) 10 to 95% by weight of acetylene glycol represented by the following general formula (1):

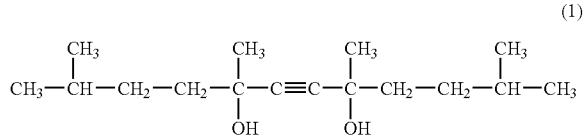

(1)

and/or an ethoxylated derivative of the acetylene glycol represented by the following general formula (2):

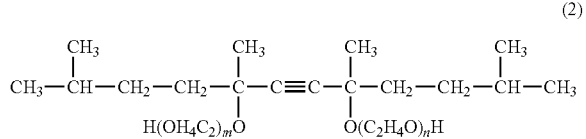

(2)

wherein m and n are respectively a positive number, and m+n is 2 to 30;

(C-2) 5 to 90% by weight of at least one member selected from polyoxy(ethylene-propylene) block polymers represented by the following formula (3):

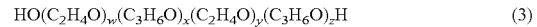

$$HO(C_2H_4O)_w(C_3H_6O)_x(C_2H_4O)_y(C_3H_6O)_zH \qquad (3)$$

wherein w, x, y, and z are respectively 0 or a positive number with the proviso that w+x+y+z>0, the block polymer having a weight average molecular weight of 1,500 to 10,000, an ethylene oxide content of 35 to 90% by weight, and a propylene oxide content of 10 to 65% by weight; and (C-3) 0 to 25% by weight of at least one member selected from water, a water soluble organic solvent, and an acetylene glycol or ethoxylated derivative thereof other than those of the formulae (1) and (2).

EFFECTS OF THE INVENTION

The present invention provides a coating composition for a metal not containing a rust preventive pigment, but which exhibits excellent rust preventive property as well as improved water resistance and good adhesion to the metal.

The coating composition for a metal of the present invention can be directly applied to the metal surface without being repelled or causing coating inconsistency even if an oily substance is present on the metal surface.

DESCRIPTION OF THE PREFERRED EMBODIMENTS

This invention relates to a coating composition for a metal comprising
100 parts by weight of a synthetic resin solid content (A);
1 to 200 parts by weight of a filler (B); and
0.01 to 10 parts by weight of a mixture of
(C-1) 10 to 95% by weight of acetylene glycol represented by the following general formula (1):

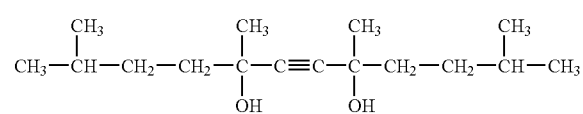
(1)

and/or an ethoxylated derivative of the acetylene glycol represented by the following general formula (2):

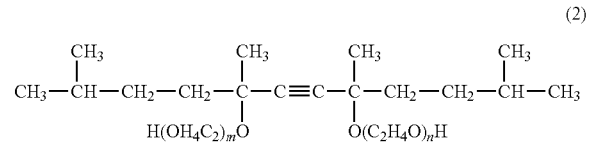
(2)

wherein m and n are respectively a positive number, and m+n is 2 to 30;
(C-2) 5 to 90% by weight of at least one member selected from polyoxy(ethylene-propylene) block polymers represented by the following formula (3):

$HO(C_2H_4O)_w(C_3H_6O)_x(C_2H_4O)_y(C_3H_6O)_zH$ (3)

wherein w, x, y, and z are respectively 0 or a positive number with the proviso that w+x+y+z >0, the block polymer having a weight average molecular weight of 1,500 to 10,000, an ethylene oxide content of 35 to 90% by weight, and a propylene oxide content of 10 to 65% by weight; and
(C-3) 0 to 25% by weight of at least one member selected from water, a water soluble organic solvent, and an acetylene glycol or ethoxylated derivative thereof other than those of the formulae (1) and (2).

As described above, of the mixture incorporated in the coating composition for a metal of the present invention, the component (C-1) is at least one acetylene glycol or its derivative selected from 2,5,8,11-tetramethyl-6-dodecyne-5,8-diol represented by the following general formula (1) and an ethylene oxide derivative of 2,5,8,11-tetramethyl-6-dodecyne-5,8-diol represented by the following general formula (2):

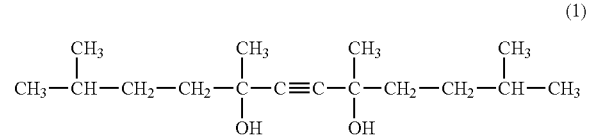
(1)

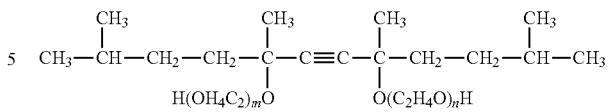
(2)

wherein m and n are respectively a positive number, and m+n is 2 to 30, and preferably 4 to 12.

Total molar number of the ethylene oxide added in the ethoxylated derivative represented by the formula (2) is 2 to 30 moles, and preferably 4 to 12 moles. When the molar number of the ethylene oxide added exceeds 30 moles, the coating composition formed may be repelled in the course of coating.

The component (C-1) may preferably have a sodium content of up to 1,000 ppm (0 to 1,000 ppm). Use of the component (C-1) with the sodium content up to such amount will prevent loss of rust preventive properties and water resistance. In order to enhance such effect, the component (C-1) may preferably have a potassium content of up to 2,000 ppm (0 to 2,000 ppm). The sodium content and the potassium content may be controlled to such range, for example, by purification of the acetylene glycol, use of highly purified starting materials, and synthesis of the acetylene glycol in a production environment that will prevent contamination of the metal. The coating composition is preferably applied to a metal such as iron, steel, copper, and aluminum, and the surface of the metal used may be preliminarily surface treated.

The component (C-1) included the mixture has triple bond in its molecule, and this triple bond is postulated to realize the high affinity with the metal such as iron, steel, copper, and aluminum, and formation of the dense metal, and accordingly the coating formed will exhibit excellent adhesion and rust preventive properties. The component (C-1) also has a hydrophobic group in its structure, and the composition is less likely to entrain water, and accordingly, the coating exhibits excellent water resistance.

The acetylene glycol or its derivative [component (C-1)] as described above may be used alone or in combination of two or more, and in preparing the mix incorporated in the coating composition for a metal of the present invention, the component (C-i) maybe used at an amount of 10 to 95% byweight, and preferably at 40 to 70% by weight in relation to the total of the components (C-1) and (C-2) and the component (C-3) as described below. When used at an amount of less than 10% by weight, the effect of bubble removal by gas purging with the liquid may become insufficient to invite defects such as increase in the number of pin holes formed in the resulting coating. When this amount exceeds 95% by weight, solubility in water may become insufficient when used in preparing an aqueous coating composition.

The polyoxy(ethylene-propylene) block copolymer of the component (C-2) blended with the acetylene glycol or its derivative of the component (C-1) may be the polyoxyalkylene alkyl ether represented by the following formula (3):

$HO(C_2H_4O)_w(C_3H_6O)_x(C_2H_4O)_y(C_3H_6O)_zH$ (3)

(wherein w, x, y, and z are 0 or a positive number with the proviso that w+x+y+z is greater than 0), and examples include:
$HO(C_2H_4O)_w(C_3H_6O)_{20}(C_2H_4O)_yH$ (wherein w+y=27),
$HO(C_2H_4O)_w(C_3H_6O)_{30}(C_2H_4O)_yH$ (wherein w+y=160),
$HO(C_2H_4O)_w(C_3H_6O)_{35}(C_2H_4O)_yH$ (wherein w+y=30),
$HO(C_2H_4O)_w(C_3H_6O)_{35}(C_2H_4O)_yH$ (wherein w+y=48), HO(C$_2$H$_4$O)$_w$(C$_3$H$_6$O)$_{20}$(C$_2$H$_4$O)$_y$H (wherein w+y=155), and HO(C$_3$H$_6$O)$_x$(C$_2$H$_4$O)$_{155}$(C$_3$H$_6$O)$_z$ (wherein x+z =30), which may be used alone or in combination of two or more.

The component (C-2) has a weight average molecular weight calculated in terms of polystyrene as measured by gel permeation chromatography (GPC) of 1,500 to 10,000, and preferably 3,000 to 9,000. When the molecular weight is less than 1,500, solubility in water may become insufficient when used in preparing an aqueous coating composition. The molecular weight in excess of 10,000 may invite inconsistency of the coating formed by the resulting coating composition.

The ethylene oxide content is 35 to 90% by weight, preferably 35 to 85% by weight, and more preferably 40 to 70% by weight. The content of less than 35% by weight may invite loss of miscibility in the resin component while the content in excess of 90% by weight may result in the repellency of the resulting coating composition when it is applied on a metal.

The propylene oxide is 10 to 65% by weight, preferably 15 to 65% by weight, and more preferably 30 to 60% by weight.

The component (C-2) may be incorporated at an amount of 5 to 90% by weight, and preferably at 30 to 60% by weight in relation to the total of the components (C-1) and (C-2) and the component (C-3) as will be described below. When the content of the component (C-2) is excessively low, solubilization of the component (C-2) will be insufficient, and the resulting composition may include aggregations. On the other hand, an excessive content may invite excessive foaming, which may result in the coating defects.

In present invention, the component (C-1) and the component (C-2) are preferably used so that the total of the components (C-1) and (C-2) constitutes 100% by weight. However, the coating composition of the present invention may also include pure water; a water soluble organic solvent such as ethyleneglycol, diethylene glycol, triethylene glycol, tetraethylene glycol, polyethylene glycol, propylene glycol, dipropylene glycol, 1,3-propanediol, 1,4-butanediol, or glycerin; or an acetylene glycol or an ethoxylated derivative thereof other than those of the formulae (1) or (2) such as 5,8-dimethyl-6-dodecyne-5,8-diol, 2,4,7,9-tetramethyl-5-decyne-4,7-diol, ethoxylated 2,4,7,9-tetramethyl-5-decyne-4,7-diol (molar number of the ethylene oxide added: 4), 2,4,7,9-tetramethyl-5-decyne-4,7-diol (molar number of the ethylene oxide added: 10), ethoxylated 2,4,7,9-tetramethyl-5-decyne-4,7-diol (molar number of the ethylene oxide added: 30), 4,7-dimethyl-5-decyne-4,7-diol, 8-hexadecyne-7,10-diol, 7-tetradecyne-6,9-diol, 2,3,6,7-tetramethyl-4-octyne-3,6-diol, 3,6-diethyl-4-octyne-3,6-diol, 3,6-dimethyl-4-octyne-3,6-diol, or 2,5-dimethyl-3-hexyne-2,5-diol as the component (C-3). This component (C-3) may be used to constitute 0 to 25% by weight, and preferably 5 to 20% by weight as long as such inclusion does not adversely affect the properties of the coating composition for the metal of the present invention.

As described above, the mixture of the components (C-1), (C-2), and (C-3) maybe incorporated at 0.01 to 10 parts by weight, preferably at 0.1 to 5 parts by weight, and more preferably at 0.2 to 2 parts by weight in relation to 100 parts by weight of the solid content of the component (A). Incorporation of the mixture at an excessively low content may invite a coating failure and the coating composition may be repelled in the course of coating. On the other hand, incorporation of the mixture at an excessive amount may also invite coating failure due to increase of the bubbling.

The main component constituting the coating composition for a metal of the present invention is the component (A), and this component (A) is preferably at least one member selected from (meth)acrylate resin emulsion, styrene-acrylate copolymer emulsion, vinyl acetate resin emulsion, vinyl acetate-(meth)acrylate copolymer emulsion, urethane resin emulsion, ethylene-vinyl acetate copolymer emulsion, polyester resin, and water soluble epoxy resin. Among these, the preferred in view of versatility and cost are (meth)acrylate resin emulsion, styrene-acrylate copolymer emulsion, vinyl acetate resin emulsion, and vinyl acetate-(meth)acrylate copolymer emulsion. The resin may be either the one produced by emulsion polymerization using a known polymerization method or a commercially available product. The emulsion used for the component (A) preferably has a solid content of 20 to 60% by weight, and more preferably, a solid content of 30 to 50% by weight.

The monomer containing an unsaturated group used for the component (A), and in particular, (meth)acrylate resin emulsion, styrene/acrylate copolymer emulsion, vinyl acetate resin emulsion, and vinyl acetate/(meth)acrylate copolymer emulsion is not particularly limited, and exemplary monomers include ethylene, propylene; vinyl carboxylate monomers such as vinyl acetate and vinyl propionate; aromatic vinyl monomers such as styrene and α-methylstyrene; conjugated diene monomers such as 1,3-butadiene and 2-methyl-1,3-butadiene; ethylenically unsaturated monocarboxylate esters such as methyl acrylate, ethyl acrylate, butyl acrylate, 2-ethylhexyl acrylate, and methyl methacrylate; ethylenically unsaturated dicarboxylate esters such as dimethyl itaconate, diethyl maleate, monobutyl maleate, monoethyl fumarate, and dibutyl fumarate; ethylenically unsaturated monocarboxylic acids such as acrylic acid, methacrylic acid, and crotonic acid; ethylenically unsaturated dicarboxylic acids such as itaconic acid, maleic acid, and fumaric acid; epoxy group-containing monomers such as glycidyl methacrylate; alcohol group-containing monomers such as 2-hydroxyethyl methacrylate; alkoxyl group-containing monomers such as methoxyethyl acrylate; nitrile group-containing monomers such as acrylonitrile; amide group-containing monomer such as acrylamide; amino group-containing monomer such as dimethylaminoethyl methacrylate; and a monomer containing two or more ethylenically unsaturated groups such as divinylbenzene and allylmethacrylate. The emulsion polymerization may be conducted by using such monomers.

The emulsion polymerization may be accomplished by any emulsion polymerization method known in the art. The unsaturated group-containing monomer and other polymerization aids (such as an emulsifying agent such as alkyl sulfate ester salt, a polymerization initiator such as ammonium sulfate, a pH adjusting agent such as sodium carbonate, and various antifoaming agents) may be added at once at the initial stage of the reaction; continuously in the course of the reaction; or intermittently or in divided dose during the polymerization.

The emulsifying agent used in such emulsion polymerization include the surfactants as described in the following (1) to (4), and such surfactant may be used either alone or in combination of two or more.

(1) Anionic Surfactant

Surfactants such as alkyl sulfate ester salt, polyoxyethylene alkyl ether sulfate ester salt, alkyl benzene sulfonate, alkyl diphenyl ether disulfonate, alkyl naphthalene sulfonate, fatty acid salt, dialkyl sulfosuccinates salt, alkyl phosphate ester salt, and polyoxyethylene alkylphenyl phosphate ester salt.

(2) Nonionic Surfactant

Surfactant such as polyoxyethylene alkylphenyl ether, polyoxyethylene alkyl ether, polyoxyethylene fatty ester, sorbitan fatty acid ester, polyoxyethylene sorbitan fatty acid ester, polyoxyalkylene alkyl ether, polyoxyethylene derivative, glycerin fatty acid ester, polyoxyethylene hydrogenated castor oil, polyoxyethylene alkylamine, alkyl alkanol amide, or acetylene alcohol, acetylene glycol, and their ethylene oxide adduct.

(3) Cationic Surfactant

Surfactant such as alkyltrimethyl ammonium chloride, dialkyl dimethyl ammonium chloride, alkyl benzyl ammonium chloride, and alkylamine salt.

(4) Polymerizable surfactant having a radically polymerizable double bond in its molecule, for example, alkylallyl sulfosuccinate salt, methacryloyl polyoxyalkylene sulfate salt, and polyoxyethylene nonylpropenylphenyl ether sulfate salt.

Such surfactant may be used at an amount of 0.3 to 20 parts by weight, and preferably at 0.5 to 10 parts by weight in relation to the unsaturated group-containing monomer.

The polymerization initiator used in such emulsion polymerization include persulfates such as ammonium persulfate and potassium persulfate; azo compounds such as 2,2'-diamidino-2,2'-azopropane dihydrochloride and azobisisobutyronitrile; and peroxides such as cumene hydroperoxide, benzoyl peroxide, and hydrogen peroxide. The polymerization initiator used may also be a known redox initiator, for example, potassium persulfuric and sodium hydrogen sulfite. Such polymerization initiator may be used at an amount of 0.1 to 5 parts by weight, and preferably at 0.2 to 2 parts by weight in relation to the unsaturated group-containing monomer.

The temperature used for the emulsion polymerization is generally 10 to 90° C., and preferably 50 to 80° C. The time used for the polymerization is 3 to 20 hours. The polymerization is preferably conducted in an inert atmosphere such as nitrogen gas.

The filler which is component (B) in the coating composition of the present invention is at least one member selected from titanium, talc, kaolin, bentonite, mica, silica, heavy calcium carbonate, clay, precipitated barium sulfate, barium carbonate, glass beads, and resin beads.

The component (B) is used at an amount of 1 to 200 parts by weight, preferably 5 to 150 parts by weight, and most preferably 10 to 100 parts by weight in relation to 100 parts by weight of the solid content of the component (A). When the amount of component (B) is less than 1 part by weight, the time required for drying of the coating will be unduly long, while the amount in excess of 200 parts by weight of the component (B) may results in an increased viscosity and poor elongation rate of the coating, and the resulting coating will have a reduced strength.

The coating composition for a metal of the present invention is produced by mixing the components as described above, for example, by a mixing method known in the art using a propeller blender. If desired, the component which is solid at room temperature may be added after heating.

The coating composition for a metal of the present invention may have additives incorporated therein to the extent that does not adversely affect the performance of the coating composition. The additives may be selected from, for example, humectant, dispersant, antifoaming agent, coating aid, freeze stabilizer, leveling agent, light stabilizer, and antiseptic.

The coating composition produced as described above may be used by coating on a plate, a molded article, and the like of a metal selected from iron, steel, copper, and aluminum by a method known in the art using a brush, bar coater, roll coater, and like preferably to a dry coating thickness of 1 to 1,000 μm. If desired, the coated article may be heated to an elevated temperature.

EXAMPLES

Next, the present invention is described in further detail by referring to the Examples and Comparative Examples which by no means limit the scope of the present invention. The parts and % in the Examples indicate parts by weight and % by weight, respectively.

Examples and Comparative Examples

Amount of the components (C-1), (C-2), and (C-3) blended in the coating composition are shown in Table 1.

<Mix of (C-1) and (C-2) or (C-1), (C-2) and (C-3)>

TABLE 1

| Amount | | Example | | | | | | Comparative Example | | | | |
|---|---|---|---|---|---|---|---|---|---|---|---|---|
| (% by weight) | | M-1 | M-2 | M-3 | M-4 | M-5 | M-6 | M-7 | M-8 | M-9 | M-10 | M-11 |
| Component (C-1) | Na content (ppm) | 500 | 700 | 500 | 700 | 500 | 1200 | 800 | 500 | 500 | 500 | 700 |
| | C-1-1 | 40 | | 65 | | 55 | | | 60 | 20 | 5 | |
| | C-1-2 | | 30 | | 30 | | | | | | | 97 |
| | C-1-3 | | | | | | | 40 | | | | |
| | C-1-2' | | | | | | 30 | | | | | |
| Component (C-2) | C-2-1 | 60 | | | | | | 70 | | | | |
| | C-2-2 | | 50 | | | 35 | | | | | 95 | 3 |
| | C-2-3 | | | 25 | | | | 60 | | | | |
| | C-2-4 | | | | 60 | | | | | | | |
| | C-2-5 | | | | | | | | 40 | | | |
| | C-2-6 | | | | | | | | | 70 | | |
| Component (C-3) | EG | | | 5 | | | | | | | | |
| | PG | | 20 | 5 | | | | | | | | |
| | Pure water | | | | | | | | | | 10 | |
| | C-3-1 | | | | | 20 | | | | | | |
| | C-3-2 | | | | | | 10 | | | | | |

Component (C-1)

C-1-1: 2,5,8,11-tetramethyl-6-decyne-5,8-diol represented by formula (1)

C-1-2: ethoxylated 2,5,8,11-tetramethyl-6-decyne-5,8-diol (molar number of the ethylene oxide added: m+n=6) represented by formula (2)

C-1-3: ethoxylated 2,5,8,11-tetramethyl-6-decyne-5,8-diol (molar number of the ethylene oxide added: m+n=50) represented by formula (2)

C-1-2': a compound having a composition of ethoxylated 2,5,8,11-tetramethyl-6-decyne-5,8-diol (molar number of the ethylene oxide added: m+n=6)

Component (C-2)

C-2-1: Epan 750
(product name of $HO(C_2H_4O)_w(C_3H_6O)_{35}(C_2H_4O)_yH$, wherein w+y=48; manufactured by Dai-ichi Kogyo Seiyaku Co., Ltd.; weight average molecular weight, 4,000; ethylene oxide content, 51%; propylene oxide content, 49%)

C-2-2: Epan 680
(product name of $HO(C_2H_4O)_w(C_3H_6O)_{30}(C_2H_4O)_yH$, wherein w+y=160; manufactured by Dai-ichi Kogyo Seiyaku Co., Ltd.; weight average molecular weight, 8,800; ethylene oxide content, 80%; propylene oxide content, 20%)

C-2-3: Epan 485
(product name of $HO(C_2H_4O)_w(C3H_6O)_{20}(C_2H_4O)_yH$, wherein w+y=155; manufactured by Dai-ichi Kogyo Seiyaku Co., Ltd.; weight average molecular weight, 8,000; ethylene oxide content, 85%; propylene oxide content, 15%)

C-2-4: Pluronic 25R8
(product name of $HO(C_3H_6O)_s(C_2H_4O)_{155}(C_3H_6O)_xH$, wherein x+z=30; manufactured by BASF; weight average molecular weight, 8,550; ethylene oxide content, 80%; propylene oxide content, 20%)

C-2-5: Epan 410
(product name of $HO(C_2H_4O)_w(C_3H_6O)_{20}(C_2H_4O)_yH$, wherein w+y=2; manufactured by Dai-ichi Kogyo Seiyaku Co., Ltd.; weight average molecular weight, 1,330; ethylene oxide content, 7%; propylene oxide content, 92%)

C-2-6: Epan 785
(product name of $HO(C_2H_4O)_w(C_3H_6O)_{35}(C_2H_4O)_yH$ wherein w+y=250; manufactured by Dai-ichi Kogyo Seiyaku Co., Ltd.; weight average molecular weight, 13,000; ethylene oxide content, 84%; propylene oxide content, 16%)

Component (C-3)
EG: ethyleneglycol
PG: propylene glycol

C-3-1: Surfynol 104
(product name of 2,4,7,9-tetramethyl-5-decyne-4,7-diol manufactured by Air Products)

C-3-2: Surfynol 440
(product name of ethoxylated derivative of 2,4,7,9-tetramethyl-5-decyne-4,7-diol, molar number of the ethylene oxide added: 3.5 moles, manufactured by Air Products)

Na was quantitatively determined by ICP emission spectrophotometer (IRIS Intorepid II XSP).

[Preparation of the Coating Composition]

50 parts of Vinyblan 2583 (product name of an acryl emulsion manufactured by Nissin Chemical Industry Co., Ltd., solid content, 45%), 30 parts of the filler paste as described below, 15 parts of ion exchanged water, 4 parts of 5% aqueous solution of adipic acid dihydrazide, and 1 part of the mix (M-1 to M-11) were mixed to produce the coating composition for evaluation.

[Preparation of Filler Paste]

70 parts of titanium dioxide (Typaque R-780 manufactured by Ishihara Sangyo Kaisha Ltd.), 0.5 parts of antifoaming agent (Surfynol DF-58 manufactured by Air Products), 5 parts of pigment dispersant (Dispersant BYK-190 manufactured by BYK-Chemie GmbH), and 24.5 parts of ion exchanged water were mixed, and dispersed with Disper to produce the pigment paste.

[Preparation of the Sample Coated with the Coating Composition for the Metal]

The coating composition was applied on a zinc plated steel plate to a dry thickness of 10 μm, and then dried at 110° C. for 10 minutes to thereby produce a test plate for evaluation.

[Evaluation of the Performance of the Coating Composition]

Viscosity
The viscosity was measured by using a paddle viscometer (23° C.).

pH
The pH was measured according to JIS Z 8802 by using the sample with no further treatment.

After the test, rust generation, adhesion, and appearance of the coating were evaluated by the following criteria:

Rust Preventive Properties
The rust preventive properties were evaluated by salt spray test of the test plate according to JIS K 5600.
⊚: No rust observed at the cut. Adhesion of 100/100.
○: Red rust at the cut of up to 5%.
Δ: Red rust at the cut of 6 to 20%.
×: Red rust at the cut of in excess of 20%.

Adhesion
The adhesion was evaluated by crosscut test according to JIS K 5600.
The coating was observed after applying and peeling an adhesive tape, and the percentage of the non-peeled area is shown in the Table.

Water Resistance
The water resistance was evaluated by immersing the test plate which is the same as the one used for evaluating the adhesion in a warm water of 50° C. for 10 days, and evaluating outer appearance of the coating (discoloration, swelling, peeling, etc.) and adhesion.
⊚: No change in the outer appearance of the coating, with the adhesion of 100/100.
○: Swelling at the cuts with the adhesion of 80/100 or higher.
Δ: Swelling at the cuts with the adhesion of 50/100 or higher.
×: Swelling at the cuts with the adhesion of less than 50/100.

The results are shown in Table 2.

TABLE 2

| Blend | Example | | | | | | Comparative Example | | | | |
| --- | --- | --- | --- | --- | --- | --- | --- | --- | --- | --- | --- |
| | M-1 | M-2 | M-3 | M-4 | M-5 | M-6 | M-7 | M-8 | M-9 | M-10 | M-11 |
| Viscosity (KV) | 70 | 70 | 70 | 70 | 70 | 72 | 72 | 72 | 72 | 72 | 72 |
| PH | 9 | 9 | 9 | 9 | 9 | 9 | 9 | 9 | 9 | 9 | 9 |
| Rust preventive properties | ⊚ | ⊚ | ⊚ | ⊚ | ⊚ | ○ | X | X | X | Δ | X |

TABLE 2-continued

| Blend | Example | | | | | | Comparative Example | | | | |
|---|---|---|---|---|---|---|---|---|---|---|---|
| | M-1 | M-2 | M-3 | M-4 | M-5 | M-6 | M-7 | M-8 | M-9 | M-10 | M-11 |
| Water resistance | ◎ | ○ | ○ | ◎ | ◎ | Δ | X | Δ | X | Δ | X |
| Adhesion | 100 | 100 | 80 | 100 | 100 | 40 | 40 | 60 | 20 | 40 | 20 |

Japanese Patent Application No. 2006-243762 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A metal material comprising:
a substrate, which is selected from the group consisting of iron, steel, copper, aluminum and zinc plated steel, and
a coating of which is formed on the surface of the substrate, wherein the coating is formed from a coating composition comprising:
(A) 100 parts by weight of at least one synthetic resin solid content selected from the group consisting of (meth) acrylate resin emulsion, styrene-acrylate copolymer emulsion, vinyl acetate resin emulsion, vinyl acetate-(meth)acrylate copolymer emulsion, urethane resin emulsion, ethylene-vinyl acetate copolymer emulsion, polyester resin, and aqueous epoxy resin;
(B) 1 to 200 parts by weight of at least one filler selected from the group consisting of titanium dioxide, talc, kaolin, bentonite, mica, silica, heavy calcium carbonate, clay, precipitated barium sulfate, carbonic acid barium, glass beads, and resin beads; and
(C) 0.01 to 10 parts by weight of a mixture of
(C-1) 10 to 95% by weight of acetylene glycol represented by the following general formula (1):

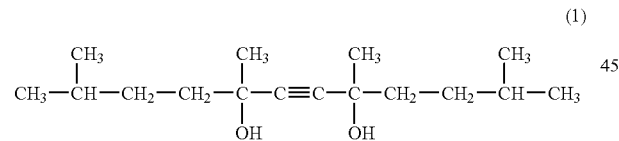

(1)

and/or an ethoxylated derivative of the acetylene glycol represented by the following general formula (2):

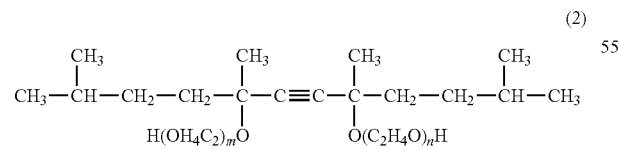

(2)

wherein m and n are respectively a positive number, and m+n is 2 to 30;
(C-2) 5 to 90% by weight of at least one member selected from polyoxy(ethylene-propylene) block polymers represented by the following formula (3):

$HO(C_2H_4O)_w(C_3H_6O)_x(C_2H_4O)_y(C_3H_6O)_zH$ (3)

wherein w, x, y, and z are respectively 0 or a positive number with the proviso that w+x+y+z>0, the block polymer having a weight average molecular weight of 1,500 to 10,000, an ethylene oxide content of 35 to 90% by weight, and a propylene oxide content of 10 to 65% by weight; and
(C-3) 0 to 25% by weight of at least one member selected from water, a water soluble organic solvent, and an acetylene glycol or ethoxylated derivative thereof other than those of the formulae (1) and (2).

2. The metal material according to claim 1, wherein the metal material is produced by applying the coating composition on a metal surface of the substrate to form a coating thereon, and resultantly, the coating prevents a rust on the metal surface.

3. The metal material according to claim 2, wherein the component (C-1) has a sodium content of up to 1,000 ppm.

4. The metal material according to claim 2, wherein the metal on which the coating composition is applied is iron, steel, copper, or aluminum.

5. The metal material according to claim 1, wherein the component (C-1) has a sodium content of up to 1,000 ppm.

6. The metal material according to claim 1, wherein the coating has a thickness of 1 to 1,000 μm.

7. A metal material consisting essentially of:
a substrate, which is selected from the group consisting of iron, steel, copper, aluminum and zinc plated steel, and
a coating of which is formed on the surface of the substrate, wherein the coating is formed from a coating composition comprising:
(A) 100 parts by weight of at least one synthetic resin solid content selected from the group consisting of (meth) acrylate resin emulsion, styrene-acrylate copolymer emulsion, vinyl acetate resin emulsion, vinyl acetate-(meth)acrylate copolymer emulsion, urethane resin emulsion, ethylene-vinyl acetate copolymer emulsion, polyester resin, and aqueous epoxy resin;
(B) 1 to 200 parts by weight of at least one filler selected from the group consisting of titanium dioxide, talc, kaolin, bentonite, mica, silica, heavy calcium carbonate, clay, precipitated barium sulfate, carbonic acid barium, glass beads, and resin beads; and
(C) 0.01 to 10 parts by weight of a mixture of
(C-1) 10 to 95% by weight of acetylene glycol represented by the following general formula (1):

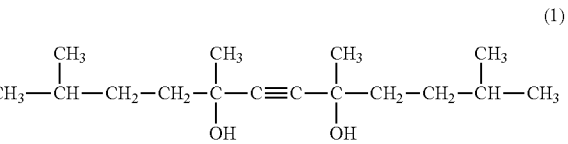

(1)

and/or an ethoxylated derivative of the acetylene glycol represented by the following general formula (2):

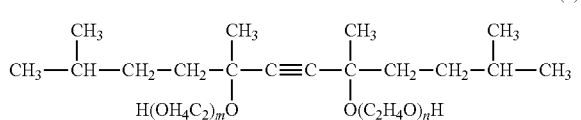

(2)

wherein m and n are respectively a positive number, and m+n is 2 to 30;

(C-2) 5 to 90% by weight of at least one member selected from polyoxy(ethylene-propylene) block polymers represented by the following formula (3):

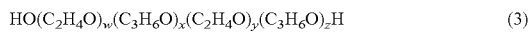

(3)

wherein w, x, y, and z are respectively 0 or a positive number with the proviso that w+x+y+z>0, the block polymer having a weight average molecular weight of 1,500 to 10,000, an ethylene oxide content of 35 to 90% by weight, and a propylene oxide content of 10 to 65% by weight; and (C-3) 0 to 25% by weight of at least one member selected from water, a water soluble organic solvent, and an acetylene glycol or ethoxylated derivative thereof other than those of the formulae (1) and (2).

8. The metal material according to claim 7, wherein the metal material is produced by applying the coating composition on a metal surface of the substrate to form a coating thereon, and resultantly, the coating prevents a rust on the metal surface.

9. The metal material according to claim 8, wherein the component (C-1) has a sodium content of up to 1,000 ppm.

10. The metal material according to claim 8, wherein the metal on which the coating composition is applied is iron, steel, copper, or aluminum.

11. The metal material according to claim 7, wherein the component (C-1) has a sodium content of up to 1,000 ppm.

12. The metal material according to claim 7, wherein the coating has a thickness of 1 to 1,000 μm.

* * * * *